June 9, 1964     E. H. BARBER     3,136,501
AIRCRAFT WING CONSTRUCTION
Filed Oct. 23, 1961
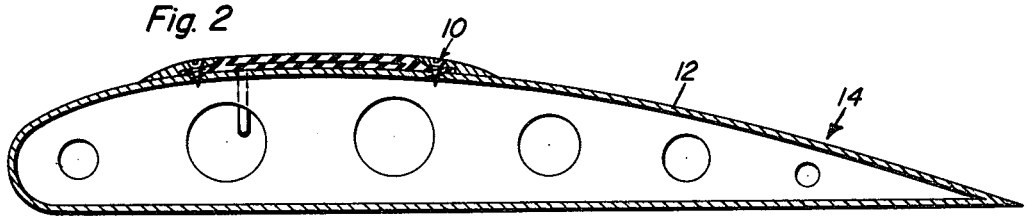
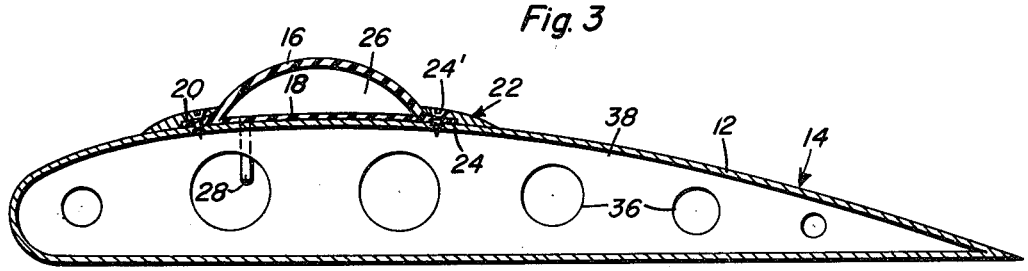
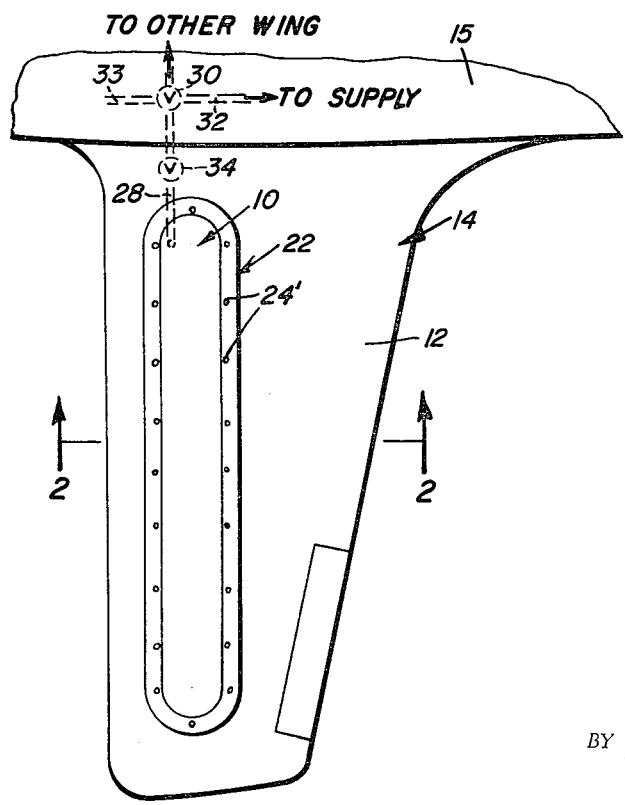
Ernest H. Barber
INVENTOR.

United States Patent Office 3,136,501
Patented June 9, 1964

3,136,501
AIRCRAFT WING CONSTRUCTION
Ernest H. Barber, 1200 S. Broad Ave., New Orleans, La.
Filed Oct. 23, 1961, Ser. No. 146,726
5 Claims. (Cl. 244—44)

This invention relates to aircraft, and particularly to a device for selectively increasing the lift of an airfoil surface.

It is a primary object of the invention to provide a device for selectively increasing the thicknesses of aircraft wings whereby the aircraft on which these devices are used may take off and land at slower speeds thereby increasing the safety thereof.

It is another object of the invention to provide a device for increasing the lift of airfoil which is operated at a remote point of a crew member of an aircraft and which comprises a flexible inflatable member or membrane, which when inflated expands and increases the camber or thickens of the airfoil or wing on which it is used.

It is still another object of the invention to provide a device which not only increases the lift of airfoils, but also increases the drag thereof thereby slowing the aircraft for more safer landings and takeoffs.

It is still another object of the invention to provide a device which not only may be inflated for increasing the lift of the aircraft wings, but may also be deflated whereby the thickness or camber of the wings is decreased for reducing the drag characteristics of the wing and permitting the aircraft to fly at maximum speed with a high degree of efficiency.

It is still another object of the invention to provide a device for improving the flight characteristics of an aircraft which device is extremely light in weight, of simple design and construction, and extremely reliable and durable in use.

It is yet another object of the invention to provide a device for selectively changing the flight characteristics of an airfoil surface which is so designed that it may be applied to conventional wing structures without reducing the strength thereof.

It is yet another object of the invention to provide a device that not only selectively alters the flight characteristics of airfoil surfaces but may be used as a de-icing means for selectively breaking and removing ice forming on airfoil surfaces during flight.

Briefly, the invention comprises an inflatable elastic membrane which is secured to the upper central surface of a conventional wing structure and extends longitudinally thereof. A conduit and valve means are operatively connected to this inflatable structure whereby the pilot or crew of the aircraft may selectively inflate a flexible membrane for changing the contour of the wing surface so as to alter the flight and aerodynamic characteristics thereof.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a plan view showing the invention installed on the upper surface of one-half of a complete wing structure;

FIGURE 2 is a vertical cross-sectional view on an enlarged scale taken substantially on the plane of the line 2—2 of FIGURE 1 showing the membrane deflated; and FIGURE 3 is a view similar to FIGURE 2 but showing the membrane inflated.

As shown in the drawings, the invention comprises a flattened flexible and elastic tube 10 which is secured to the upper surface 12 of a conventional wing structure 14. The tube 10 is located approximately one-third of the length from the leading edge of the wing and extends longitudinally thereof substantially parallel to the leading edge.

The tube 10 preferably comprises two elongated oval-shaped flexible and elastic members 16 and 18 which are sealed together at their edge portions 20 by conventional means such as vulcanizing to form a tube. Normally, these members would be composed of flat sheets of rubber.

Referring to FIGURE 2, the tube 10 is stretched flat over the upper surface of the wing and the lower member 18 is preferably bonded to the wing surface. The outer edges of the tube are overlapped and secured to the wing surface by means of an oval-shaped molding 22. The molding 22 is preferably composed of metal, and as shown in FIGURE 3, is substantially triangular in cross-section so that its outer surface tapers toward and blends into the surface of the wing 14. The molding 22 has a generally rectangular notch 24 formed in its lower inner surface. The notch 24 receives the edge 20 of the tube 10. Screws 24' extend through bores in the molding 22, through the edges 20 of the tube, and are securely threaded into the wing structure.

FIGURE 1 shows only one tube mounted on one semi-span of the wing 14. However, the opposite semi-span of the wing 14 also has an identical tube mounted on its upper surface.

As shown in FIGURE 1, each of the tubes 10 has its interior chamber 26 operatively connected to a supply of fluid pressure by means of a conduit 28 extending from the tube to a selector valve 30 which in turn is connected to a supply of fluid pressure by conduit 32. Each tube 10 is provided with a pressure relief valve 34 in the conduit 28. Conduit 28 may extend through the conventional punched out openings 36 in the wing ribs 38.

In normal flight, the tube 10 would be maintained flat against the wing surface by the tension therein as illustrated in FIGURE 2. During takeoff or landing, the pilot or one of the crew members of the aircraft within the fuselage 15 operates the selector valve 30 to admit fluid pressure from the line 32 into the lines 28 whereby the upper flexible member 16 is expanded as shown in FIGURE 3. This increases the effective thickness or camber of wing 14 which causes the air to flow over the upper surface of the wing with an increased velocity thereby greatly increasing the suction or partial vacuum above and behind the member 16. Since this increases the lift characteristics of the wing, it permits the aircraft to take off at lower speeds and to carry heavier loads. Alternatively, if the aircraft is landing or approaching an airfield at a relatively high speed, the tube 10 is also expanded in the manner described above and as illustrated in FIGURE 3. While the expansion of the tube 10 increases the lift of the wing, it also increases the drag thereof thereby acting as a brake and rapidly reducing the speed of the aircraft. This obviously permits the pilot to descend for landing at a steeper angle without increasing speed and to actually touch down at a much lower speed than normal.

When the valve 30 is operated to deflate the tubes 10, the fluid therein is exhausted through the conduit 33 connected to the valve 30. If the fluid is air, then the tube 33 may exhaust into the atmosphere. However, if a liquid is used for inflating the tubes, the conduit 33 may be connected to a reservoir. Ordinarily, a gas such as air would be used for inflating the tubes for obvious reasons.

The length, width and thickness of the tube 10 would be determined by the weight of the plane on which it is used and the cruising speed thereof although the tube 10 should extend along the thickest portion of the wing 12 and have a width somewhat less than one-third the length of the average cord of the wing 12. The speed and weight of the plane would also determine the tensile strength and elasticity of the material used for making the tube. In the case of military planes, the tube could contain self-sealing material as is often used in self-sealing fuel tanks.

While no flaps have been shown in the drawing, it is apparent that conventional flaps could be used with the flexible tube for further improving the flight characteristics of the aircraft. This is particularly true since flaps tend to cause an aircraft to nose down while my invention tends to cause the nose to rise. Thus the effects of the two devices if used together would be ventralized.

While the edges of the tube 10 have been disclosed as being secured to the upper surface of the wing 14, it is apparent that one edge of the tube could be secured and the other edge could be connected to the wing by a resilient means for maintaining tension within the tube when it is flat. Also, if the tube is installed on new aircraft, it could be recessed within the wing surface for more effective streamlining when not in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An expansible wing structure for aircraft comprising a rigid wing extending generally horizontally and having a conventional airfoil-shaped cross-section, means carried by the upper surface of said wing and extending longitudinally thereof for selectively increasing the camber and drag characteristics of said wing without changing the basic cross-sectional shape thereof, said means comprising a flexible membrane secured to the upper surface of the wing and extending longitudinally thereof along the thickest portion of the wing and being of a width somewhat less than one-third the length of the average cord of the wing, means sealing the outer edges of said membrane and connecting said edges to said upper surface, means for selectively admitting and exhausting fluid between said membrane and wing whereby the membrane is alternately expanded and contracted for changing the lift and drag characteristics of the wing.

2. A device as defined in claim 1 wherein said membrane comprises two sheets secured together at their margins.

3. The structure of claim 1 wherein said wing comprises two semi-spans on opposite sides of the aircraft, each semi-span having one of said membranes on its upper surface.

4. The structure of claim 3 wherein said membranes are connected by conduit means, a control valve connected to said conduit means for selectively admitting and exhausting fluid to and from said membranes.

5. The structure of claim 1 wherein said membrane is provided with a pressure relief valve.

References Cited in the file of this patent

UNITED STATES PATENTS

| | | |
|---|---|---|
| 2,297,951 | Frank | Oct. 6, 1942 |
| 2,932,470 | Edkins | Apr. 12, 1960 |

FOREIGN PATENTS

| | | |
|---|---|---|
| 330,435 | Germany | Dec. 15, 1920 |